United States Patent [19]
Kawano et al.

[11] Patent Number: 4,466,095
[45] Date of Patent: Aug. 14, 1984

[54] SPEECH PATH CONTROL SYSTEM

[75] Inventors: Hisao Kawano, Yokohama; Shun-ichi Naito; Yuji Shibata, both of Kawasaki, all of Japan

[73] Assignee: Fujitsu Limited, Kawasaki, Japan

[21] Appl. No.: 286,465

[22] Filed: Jul. 24, 1981

[30] Foreign Application Priority Data

Jul. 28, 1980 [JP] Japan .................................. 55-103452

[51] Int. Cl.³ ........................................... H04Q 11/04
[52] U.S. Cl. .................................... 370/63; 370/110.1; 370/58
[58] Field of Search .................. 370/63, 58, 110.1, 68, 370/66, 13, 15

[56] References Cited

U.S. PATENT DOCUMENTS

| | | | |
|---|---|---|---|
| 3,912,873 | 10/1975 | Skaperda | 370/63 |
| 4,178,483 | 12/1979 | Lager et al. | 370/63 |
| 4,254,498 | 3/1981 | Tawara et al. | 370/63 |
| 4,280,217 | 7/1981 | Hafer et al. | 370/63 |

Primary Examiner—Douglas W. Olms
Attorney, Agent, or Firm—Staas & Halsey

[57] ABSTRACT

In a time division switching system of the time-space-time (T-S-T) arrangement, a speech path memory having both forward and backward time switches has addresses corresponding to accommodated lines; and a speech signal and a non-speech signal (a signal indicating an on-hook or off-hook state and other control signals) are transmitted over a highway between each line module and a switch module. When a speech channel is busy, the speech signal is read out from a speech path memory and written therein and transmitted to a remote station. Also when the speech channel is idle, the non-speech signal is written into the speech path memory but, in this case, the non-speech signal is read out into a signal processor or a non-speech signal is written into the speech path memory from the signal processor or a non-speech signal written into the speech path memory from the signal processor is read out onto a line. With this arrangement, a memory for the exclusive use of the non-speech signal, which is required in the prior art for non-speech signal transmission can be disposed of and transmission control of control signals of various line modules can be simplified.

The speech path memory is provided with a speech signal storage area and a non-speech signal storage area, by which it is possible to transmit a large amount of information as the non-speech signal in accordance with the requirements of various line modules.

9 Claims, 12 Drawing Figures

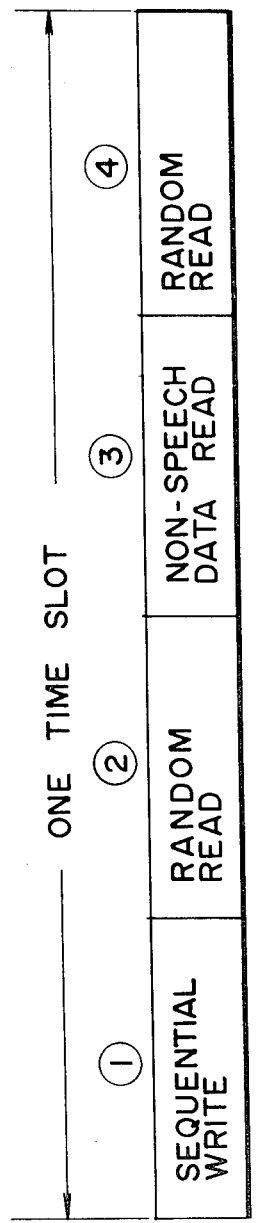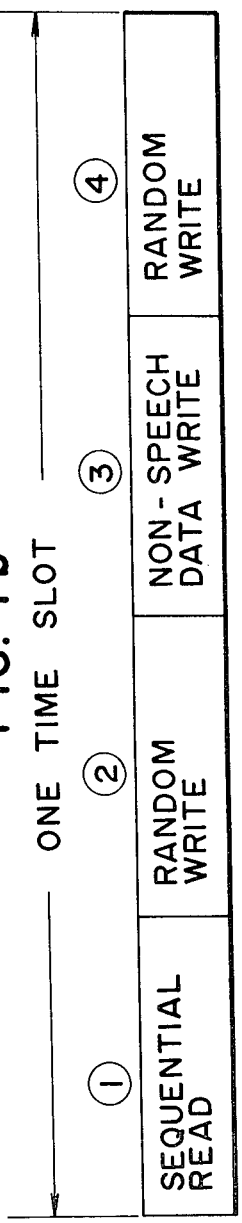
FIG. 7a
FIG. 7b

SPEECH PATH CONTROL SYSTEM

BACKGROUND OF THE INVENTION

1. Field of the Invention

The present invention relates to a signal control system in a time division switching system, and more particularly to the arrangement of a speech path memory of a time switch in the time division switching system and a system for controlling a speech signal and a non-speech signal which pass through the speech path memory.

2. Description of the Prior Art

In a digital circuit switching system, speech path equipment of the TST (Time Switch-Space Switch-Time Switch) arrangement is often provided between line modules, each having accommodated therein many subscriber line circuits and trunk circuits (See Nikkei Electronics, June 25, 1979, pp.56-61). In the line module on the output side (which recei the output from a telephone or line), the subscriber line circuits are multiplexed into one highway. The data transmitted over this highway are such that each frame consists of a predetermined number of channels, for example, 128 channels. In each frame of the data, speech data necessary for a call, such as, for example, sound data, and non-speech data necessary for line control, such as, for example, on-hook data, are respectively assigned to predetermined channels. The line module on the input side (which applies a signal to a telephone or line) separates and distributes the data from one highway to many subscribers.

During data transmission and reception between the line modules, it is general practice in the prior art to extract the non-speech data from the data transmitted over the highway from the line module of the output side, to input only the speech data to a speech path memory in a time switch of speech path equipment and to apply the non-speech data to an exclusive non-speech path memory different from the speech path memory. Also in the line module of the input side, the speech data from the speech path memory in the time switch and the non-speech data from the exclusive non-speech path memory are inserted into one highway for input to the line module for the input side.

In the prior art, since data on the lines are concentrated and fed to the speech path memory, the memory has a small capacity and has no addresses corresponding to the lines; consequently, a signal representing on-hook, off-hook or a like state for each line and other non-speech signals cannot be transmitted via the speech path memory.

Accordingly, the prior art device is disadvantageous in that it needs a memory for the exclusive use of the non-speech data and hence is expensive. In addition, it is necessary to control the speech data and the non-speech data separately from each other, which inevitably introduces complexity in the control of data transmission and reception. Further, it has heretofore been proposed, for non-speech data processing, that the line module be divided into a plurality of units (for example, a subscriber line concentration unit, a trunk circuit multiplexing unit and so forth) according to the kinds of lines accommodated therein. It also has been proposed that a non-speech data processor be incorporated in each unit for processing the non-speech signal to some extent, thereby being able to interface with a switch module using a uniform format. This permits effective use of non-speech channels on the highway, by which it is possible to flexibly accommodate a variety of line modules. Such a conventional method is, however, defective in that when the line module is used as the line concentration unit, the number of lines accommodated is limited by a concentration ratio. Because the number of lines accommodated in one line module is small, the line concentration ratio is low. In addition, a division loss causes an increase in the overhead of software for switching signal control in a small-scale system and, thus raises the cost thereof.

Moreover, the prior art encounters a problem in signal transmission and reception between a telephone exchange and other equipment provided outside the switching system. For example, master and fireman's stations connected with a volunteer fire unit can normally be used as individual telephones. When the master station transmits urgent or high priority information to some or all of the fireman stations an exchange having received a special number transmitted from the master station, after originating a call, must transfer to the volunteer fire unit a control signal used for calling the required fireman's stations at the same time. Also it is necessary to transfer to the exchange a control signal for supervising the urgent traffic between the master station and the fireman stations. The control signal is control information that does not correspond to each subscriber and which has a larger amount of control information than does a general line circuit control signal. With one of the signal control systems heretofore employed, however, such a special control signal must also be transferred within the frame length range of such a limited transmittable amount of information as mentioned previously (64 bits per frame). It is necessary in some cases to take a step of, for example, using, as the control signal, control information or frames which sometimes become unused because of non-connection of telephones with a plurality of line circuits. There is a tendency for special terminal equipment requiring such a control signal having a large amount of information to gradually spread or increase in number within a telephone company; hence, each time such special terminal equipment is employed, it is necessary to work out special measures for transferring the required control signal. It is especially difficult to accommodate this information not corresponding to each subscriber and each line.

According to one of the conventional speech path control systems, the configuration of a digital highway interconnecting the line module and the switch module is fixed or limited to 120 speech paths and eight signal paths. The eight signal paths are connected by a dropper and an inserter to a main processor via a scanner and a signal distributor without being directly connected to the speech path memory of the time switch in the switch module. Therefore, when no control by the main processor of the exchange is required, as in the case of special (pulse coded modulation) PCM lines which are accommodated in the line module and from which control signals have been separated by a common signalling system, digital signals must be transmitted over the 120 speech paths alone, leaving the eight signal paths unused. In this respect the prior art speech path control system is economically disadvantageous.

As described above, it is customary in the prior art to process the speech data and the non-speech data (signals, control information and so forth) separately from each other and to concentrate the speech data. Accordingly, the prior art possesses shortcomings in that complex control is needed because the lines and the data (the speech data and the non-speech data) have no one-to-one correspondence and in that the flexibility is lost with respect to the kinds of line modules that can be used. In addition, future enlargement of services when employing uniform interfaces for the highway between the line modules and the switch module is impaired, and limitations are imposed on the arrangement of the line modules which make it uneconomical. On the other hand, the subscriber line circuit has markedly been improved by LSI technology in recent years and, as a result, it becomes easy to perform concurrent processing of the non-speech data and the speech data on the telephone or line side of the line module. This will permit direct transmission and reception of control information through the speech channel, which will enable introduction of new services. But the prior art is economically disadvantageous, especially so in the case of small-scale systems.

SUMMARY OF THE INVENTION

It is an object of the present invention to provide a signal control system which is designed so that a part of a speech path memory in a time switch is employed for non-speech data to reduce the number of memories required, thereby cutting down the cost of speech path equipment and, at the same time, simplifying control for transmission and reception of the non-speech data.

Another object of the present invention is to provide a signal control system which overcomes the aforesaid defects of the prior art and in which the speech path memory of the time switch is given addresses corresponding to all lines, so that the non-speech data for each line may be directly written into and read out of the speech path memory, whereby a control signal having diversified and abundant information can be transferred with a great deal of flexibility.

Yet another object of the present invention is to provide a signal control system which permits selective use of each time slot of a digital highway as a signal path for control signal transmission and as a speech path for sound or digital signal transmission in accordance with the kind of lines accommodated in the line module and which allows uniformity of the frame format to be maintained.

Other objects, features and advantages of the present invention will become more fully apparent from the following description taken in conjunction with the accompanying drawings.

BRIEF DESCRIPTION OF THE DRAWINGS

FIGS. 7(a) and 7(b) are diagrams illustrating a memory cycle for writing and reading data in and from a speech path memory in the embodiment of FIG. 5;

DESCRIPTION OF THE PREFERRED EMBODIMENTS

Figure 1A:
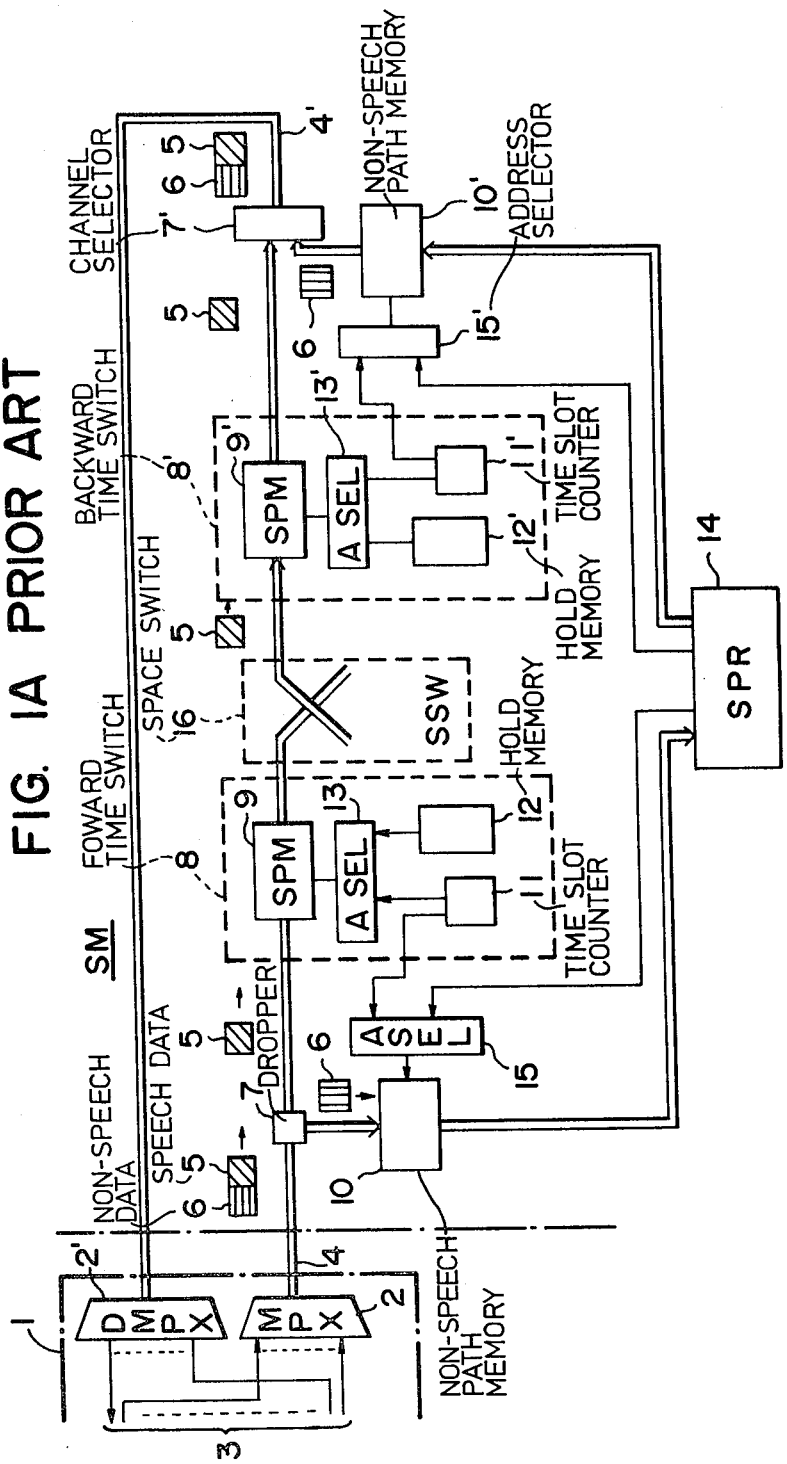
FIGS. 1A and 1B are block diagrams illustrating the prior art.

FIG. 1A is a block diagram illustrating the prior art, showing a line module, a time division network and a non-speech path memory unit connected thereto. A multiplexer 2 in a line module 1 concentrates the output sides of as many as, for example, 120 subscriber lines 3 (speech signal sending-out sides) into one input highway 4. Speech data 5 such as a sound signal or the like and non-speech data 6 necessary for controlling lines are transmitted over the highway 4. Non-speech data and speech data are branched by a dropper 7 and the speech data 5 is loaded in a speech path memory 9 in a forward time switch 8, whereas the non-speech data 6 is loaded in a non-speech path memory 10 which is for the exclusive use of the non-speech data 6. The time switch 8 includes a time slot counter 11, a hold memory 12 and an address selector 13. In accordance with the contents of the time slot counter 11 and the hold memory 12, the address selector 13 assigns an address for the speech data 5 in the speech path memory 9 and the speech data 5 is loaded in the assigned address. The output data from the speech path memory 9 is transferred to a space switch 16 in the next stage. The non-speech data 6 is loaded in the non-speech path memory 10 in the following manner. The non-speech data 6 branched from the dropper 7 is applied via the non-speech path memory 10 to a signal processor 14, which in turn applies a required control signal to a second address selector 15 in accordance with the inputted non-speech data. The address selector 15 also receives a signal from the time slot counter 11, and assigns an address corresponding to a channel for the non-speech data; allotted to each frame of the data and the non-speech data 6 is loaded in the non-speech path memory 10 at this assigned address.

The speech data 5 transferred from the space switch 16 is applied via a speech path memory 9' of a backward time switch 8' to a channel selector 7', which is supplied with the non-speech data 6 from a non-speech path memory 10', too. In the channel selector 7' the speech data 5 and the non-speech data 6 are combined for each frame into composite data for output on a highway 4'. The data which is transferred over the highway is distributed by a demultiplexer 2' to many subscriber lines. In FIG. 1A reference numerals 11', 12', 13' and 15' indicate a time slot counter, a hold memory and address selectors, which are identical with those numbered 11, 12, 13 and 15, respectively. Reference character SM designates a switch module, which includes the time switches 8 and 8', the space switch 16 and the signal processor 14.

As will be seen from FIG. 1A, according to the prior art, since the non-speech path memories 10 and 10' for the exclusive use of the non-speech data are needed both on the input and output sides of the line module, the cost of the system is high. Furthermore, since the non-speech path memories 10 and 10' must be controlled separately from the speech path memories 9 and 9', system control is complex.

In addition, because the speech path memories 9 and 9' have no addresses corresponding to the lines, the non-speech data for each line cannot be transmitted via the speech path memories. For a solution to this problem the non-speech path memories must be provided.

Figure 1B:
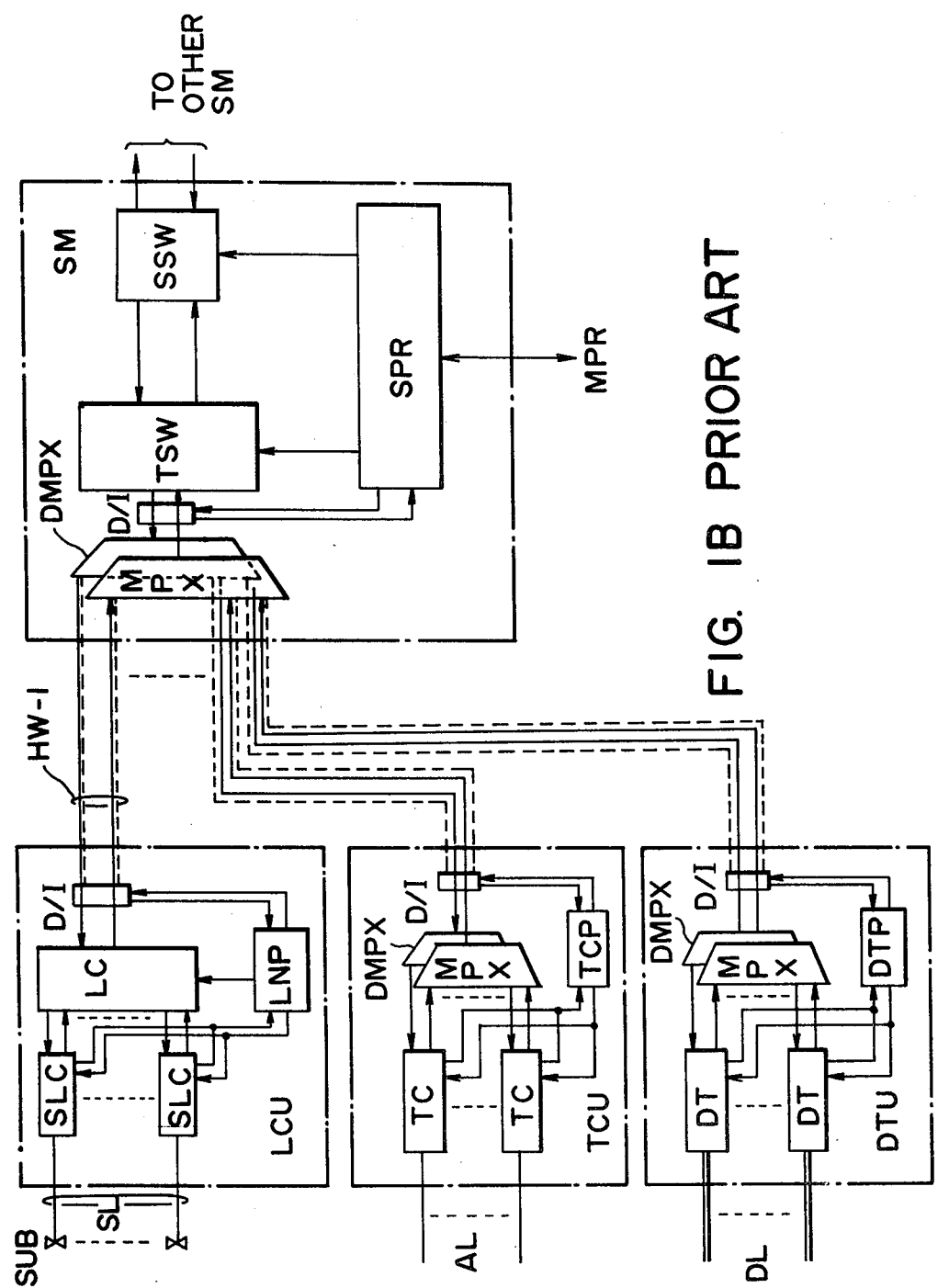

FIG. 1B is a block diagram used for explaining the prior art, showing a line module having incorporated therein processors for processing the non-speech data and a switch module connected with the line module.

In FIG. 1B the line module is composed of a line concentration unit LCU for accommodating subscriber lines SL, a trunk circuit unit TCU for accommodating analog trunk lines AL and a digital terminal unit DTU for accommodating digital trunk lines DL (for example, PCM lines). These units have incorporated therein non-speech data processors LNP, TCP and DTP respectively corresponding to the lines accommodated by the individual units.

For example, in the line concentration unit LCU an onhook signal, dial information or the like for each subscriber is detected by the line processor LNP and converted into a predetermined communication data format. Then, the information in the communication format is inserted into a specified time slot of a forward highway HW-1 by a dropper/inserter D/I in the line concentration unit LCU and applied to a switch module SM, where it is branched by a dropper/inserter D/I for input to a signal processor SPR, performs exchange processing.

For example, the sending out of a ringing signal to a subscriber telephone SUB is controlled in the following manner. A ringing control signal from the signal processor SPR is inserted in the form of a predetermined communication data format into a specified time slot of a backward highway HW-1 by the dropper/inserter D/I of the switch module SM and sent to the line concentration unit LCU. The signal is branched by the dropper-/inserter D/I of the line concentration unit LCU into the line processor LNP, where it is decoded to control a ringing control relay in a subscriber line circuit SLC at a predetermined time. Further, the line processor LNP assigns an arbitrary subscriber to a speech time slot of the highway by controlling a line concentrator LC under instructions from the signal processor SPR, thus performing line concentration control of the speech paths.

Since the trunk circuit unit TCU and the digital terminal unit DTU accommodate trunk lines as opposed to subscriber lines, no line concentration control is carried out; however, the trunk circuit processor TCP and the digital trunk processor DTP do conduct various types of signal control by communicating with the signal processor SPR which communications are similar to those between the line concentration unit LCU and the signal processor SPR. In FIG. 1B reference character TC indicates trunk circuits and DT designates digital trunk circuits. The broken lines show highways for transmitting the non-speech data.

As will be understood from FIG. 1B, according to the prior art, since non-speech data are processed, by processors provided in the line modules, independently of the speech data, the cost of the system is inevitably high. Since small numbers of lines are concentrated, the concentration efficiency is poor and a division loss occurs and, in a small-scale system, the overhead in software for switching signal control increases.

Figure 2:
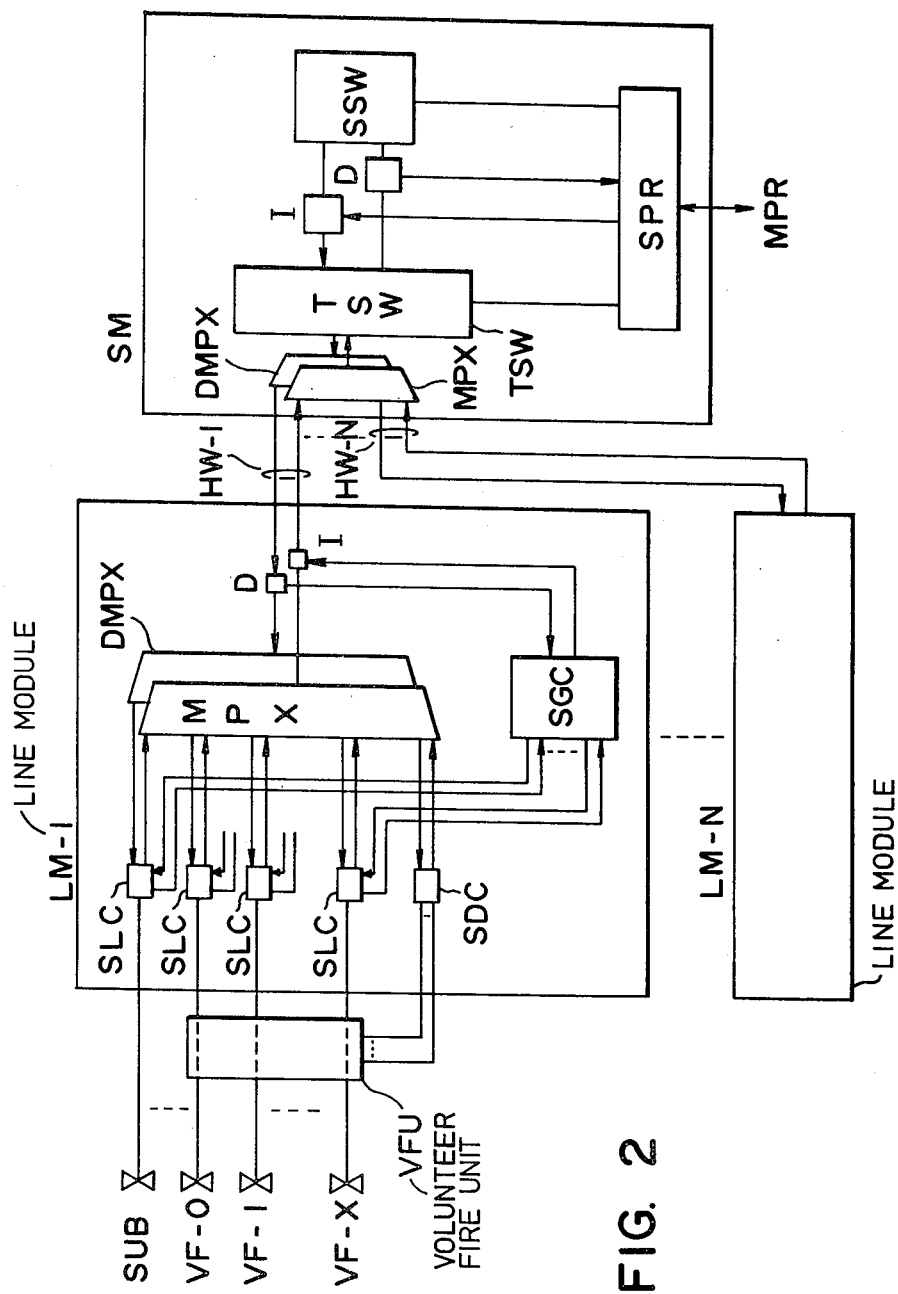
FIG. 2 is a block diagram illustrating an embodiment of the present invention.
Figure 3:
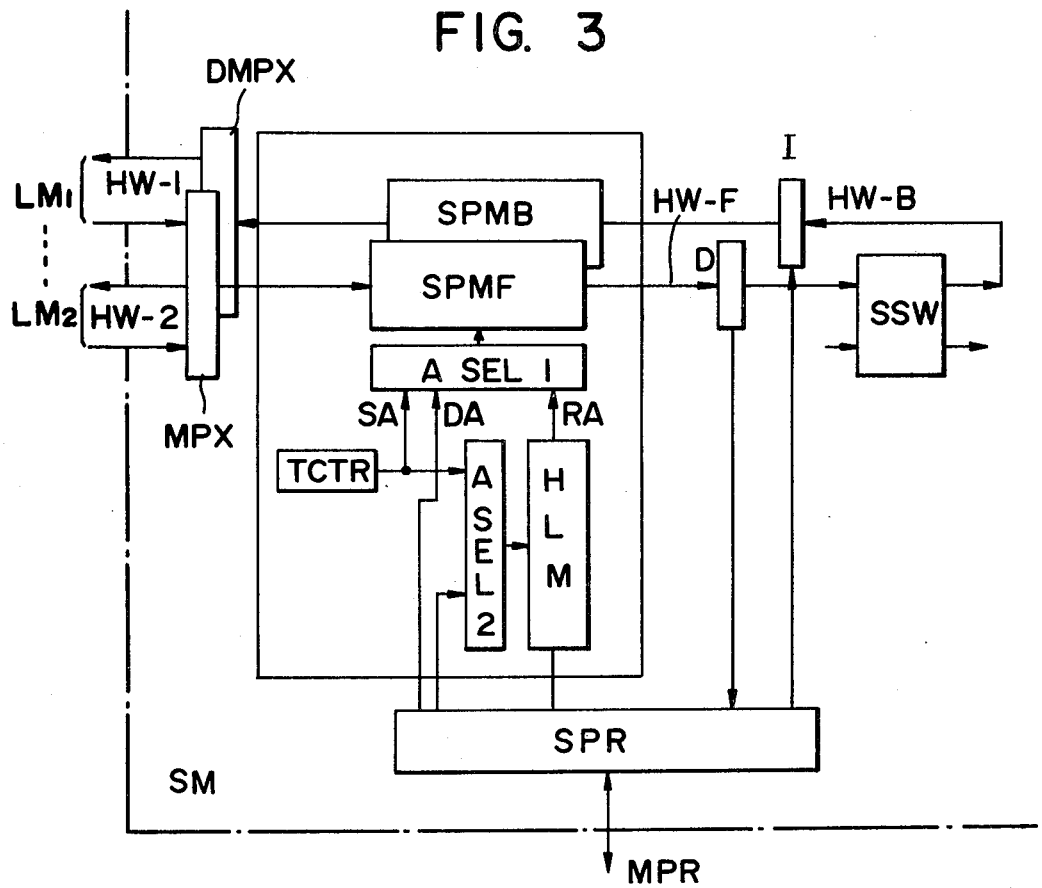
FIG. 3 is a block diagram illustrating in detail a switch module employed in the embodiment of FIG. 2.
Figure 4:
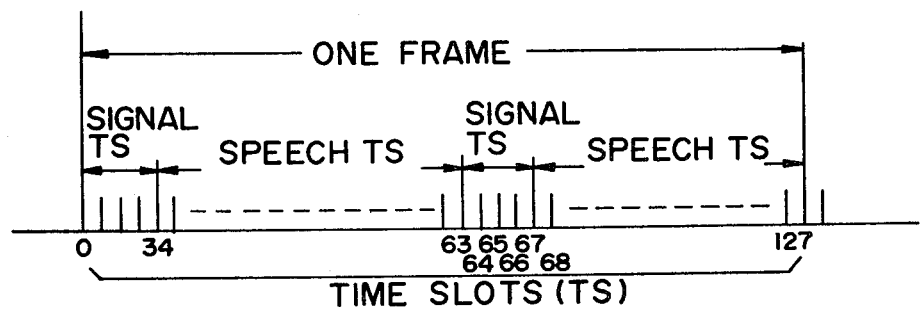
FIG. 4 is a diagram illustrating an example of the frame configuration usable in the embodiment of FIG. 2.

A description will be given, with reference to FIGS. 2 and 3, of a preferred embodiment of the present invention. FIG. 2 illustrates in block diagram form an embodiment of the signal control system of the present invention in a time division switching system of the same type (TST) as illustrated in FIG. 1. FIG. 3 shows in detail means for writing and reading a control signal in a switch module employed in the embodiment of FIG. 2. In FIG. 2, there are accommodated by a line module LM-1 a plurality of individual telephones SUB and a master station VF-0 and fireman's stations VF-1 to VF-X via a volunteer fire unit VFU. The telephones VF-1 to VF-X accommodated via the volunteer fire unit VFU can normally be used in the same manner as the individual telephones SUB. In FIG. 2, the line modules LM-1 to LM-N, each having accommodated subscriber lines, are connected to a switch module SM via multiplex highways HW-1 to HW-N. The multiplex highways HW-1 to HW-N all employ a frame format as depicted in FIG. 4; namely, they repeatedly transmit a sound signal and a control signal every 125 microseconds using the frame format exemplified in FIG. 4. Each frame is divided into 128 time slots TS. Time slots TS4 to TS63 and TS68 to TS127 form 120 speech paths for transmitting eight bit, PCM-coded sound signals and time slots TS0 to TS3 and TS64 to TS67 form eight signal paths for transmitting eight-bit control signals.

A sound signal from each of the ordinary line circuits SLC in the line module LM-1 is coded into an eight-bit PCM code and applied to a multiplexer MPX. The multiplexer MPX transmits the sound signal from each line circuit SLC to the switch module SM by time-division multiplexing the signal into the 120 speech path time slots of the multiplex highway HW-1 (the time slots TS4 to TS63 and TS68 to TS127 in FIG. 4) Accordingly, 120 telephone line circuits can be accommodated by the line module LM-1. A control signal for each line circuit SLC is time-division multiplexed by a signal control circuit SGC and inserted by an inserter I into eight signal paths of the multiplex highway HW-1 (the time slots TS0 to TS3 and TS64 to TS67 in FIG. 4) and transmitted to the switch module SM. Processing of the sound signal and the control signal transmitted via the multiplex highway HW-1 to the switch module will be described with regard to FIG. 3. In FIG. 3, the sound signals and the control signals transmitted from the plurality of line modules LM-1 to LM-N via the highways HW-1 to HW-N are time-division multiplexed by a multiplexer MPX into a parallel eight-bit signal, thereafter the parallel eight-bit signal is applied to a speech path memory SPMF of a forward time switch. The speech path memory SPMF has addresses corresponding to all speech paths and signal paths of the high-ways HW-1 to HW-N and has a storage capacity of eight bits for each address. Assuming that the two highways HW-1 and HW-2 are multiplexed, the speech path memory SPMF has 256 addresses and the sound signals and the control signals of each of the highways HW-1 and HW-2 from the multiplexer MPX are written, within a one-frame period, in addresses which are assigned by an address selector ASEL1 which steps on the output from a time slot counter TCTR. The sound signal and the control signal thus written in the speech path memory SPMF are read out, based on known time division switching principles, from addresses assigned by a hold memory HLM and transmitted to a space switch SSW using respective time slots of a highway HW-F. When the control signal has been read out, a dropper D operates to branch the control signal from the highway HW-F to a signal processor SPR. The sound signals are exchanged by the space switch SSW between a plurality of highways HW-F and HW-B, and then provided via the highway HW-B to a speech path memory SPMB of a backward time switch. Thereafter, the sound signals are transmitted via the highways HW-1 and HW-2 to the line modules LM-1 and LM-2. The control signals which are transferred from the signal processor SPR to the line modules LM-1 and LM-2 are inserted by an inserter I into a predetermined time slot of the highway HW-B and then transferred to the line modules LM-1 and LM-2 along with the sound signals. The frame format for the data of the highway HW-1 which is transmitted from the switch module SM to the line module LM-1 and the transfer paths of the sound signals and the control signals to the line circuits SLC via the highway HW-1 are the same as those in FIG. 2. For transferring control signals for supervising and controlling the volunteer fire unit VFU, a control signal coding circuit SDC is included, which is connected to the multiplexer MPX instead of an arbitrary one of the 120 line circuits SLC. The control signal coding circuit SDC supervises the operative condition of the volunteer fire unit VFU and passes the resulting control signal to the multiplexer MPX after coding it, for example, into an eight-bit code. If the information is less than eight bits, it may be applied directly to the multiplexer MPX without being coded. The multiplexer MPX handles the eight-bit coded control signal in the same manner as the sound signal, which is transmitted from the line circuit SLC which has been excluded because of the provision of the control signal coding circuit SDC, and transmits the control signal to the switch module SM using one speech path of the highway HW-1. The control signal thus transmitted via the speech path of the highway HW-1 is written at a speech path corresponding address DA in the speech path memory SPMF of the switch module SM along with the sound signal transmitted via another speech path. The control signal thus written into the speech path memory SPMF is read out into a predetermined time slot of the highway HW-F by the assigned address DA output by the signal processor SPR. In or during the period of this time slot the dropper D operates to branch this control signal from the highway HW-F to the signal processor SPR. In this way, the control signal obtained as a result of supervising the volunteer fire unit VFU by the control signal coding circuit SDC in the line module LM-1 is transferred via the corresponding speech path to the signal processor SPR of the switch module SM. The signal processor SPR analyzes the received control signal and transfers to the volunteer fire unit VFU via the proper time slot in the switch module and line module a control signal in the form of an eight-bit code for any required control of the VFU. This control signal is inserted by the inserter I in a predetermined time slot of the highway HW-B and written into an address DA assigned and output by the signal processor SPR for a speech path memory SPMB. The control signal is read out by an address assignment generated by the time slot counter TCTR along with a sound signal written in another address of the speech path memory SPMB and then transferred to the line module LM-1 via one speech path of the highway HW-1. In the line module LM-1, the multiplexer MPX sends the control signal to the control signal coding circuit SDC corresponding to the speech path over which the control signal was transmitted. The control signal coding circuit SDC decodes the received control signal, for example, in the form of an eight-bit code and provides the decoded control signal to the volunteer fire unit VFU, and the VFU executes predetermined control functions.

As will be appreciated from the above, according to this embodiment, the control signals, for supervising and controlling the volunteer fire unit VFU, are transferred to the signal processor SPR of the switch module SM via the one of the speech paths of the highway HW-1 corresponding to the control signal coding circuit SDC provided in the line module LM-1 rather than an arbitrary one of the line circuits SLC. Accordingly, control signals having any required amount of information are transferred over the abovesaid speech path without being specifically limited to the eight signal paths prepared in the highway HW-1 for transferring control signals for ordinary line circuits SLC.

The equipment which calls for transfer of such special control signals is not limited specifically to the volunteer fire unit VFU but may be special terminal equipment which requires control information that does not directly correspond to the subscriber or trunk lines, such as remote supervisory and testing equipment for the line module LM-1, or some other equipment; in any case, the effect of the present invention can be produced. Equipment which requires special control signals and the speech paths for transmitting the control signals need not have a one-to-one correspondence. Namely, it is also possible to transmit control signals for a number of pieces of equipment over one speech path or transmit control signals for one piece of equipment over a number of speech paths depending on the amount of information to be transmitted. Moreover, the number of lines accommodated by the line module LM-1 and the number of speech paths of the highway HW-1 need not always be limited to 120 and the control signal coding circuit SDC may be provided as an arbitrary one of the line circuits SLC instead of taking the place of a specified one of them.

Figure 11:
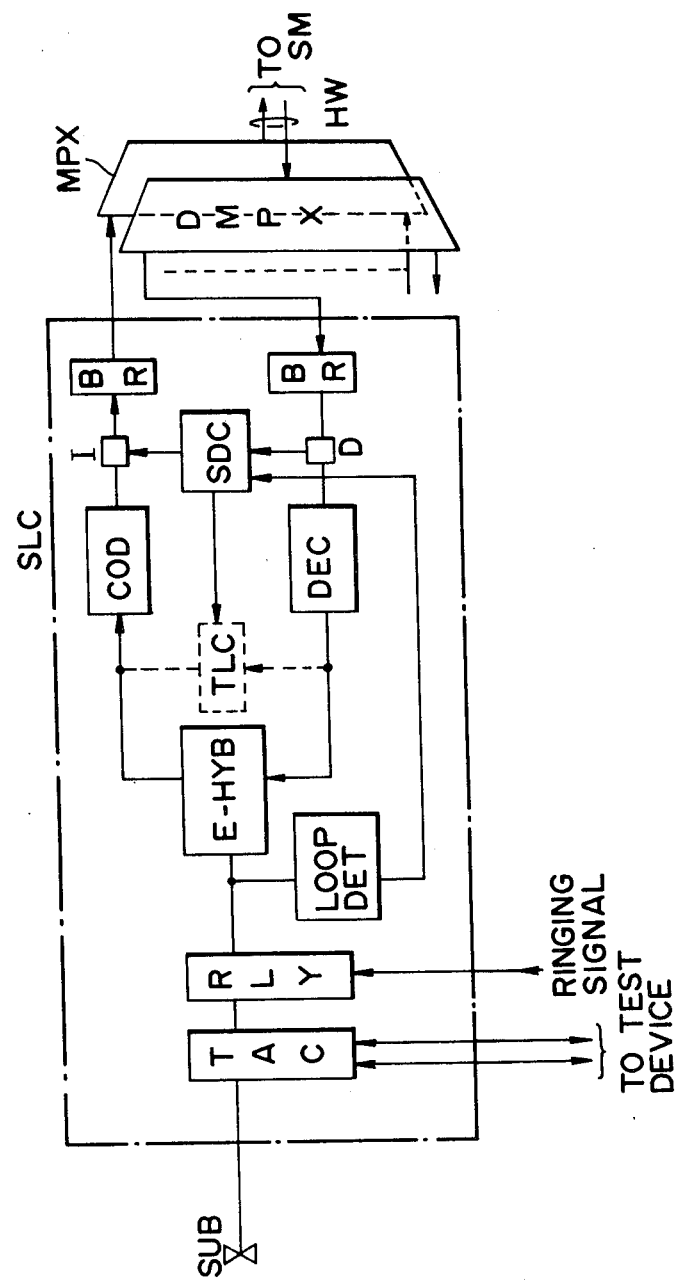
FIG. 11 is a detailed block diagram illustrating a subscriber line circuit in the embodiment of FIG. 2.

FIG. 11 illustrates in block diagram form a specific example of the subscriber line circuit SLC applicable to the embodiment illustrated in FIG. 2. When this subscriber line circuit SLC is employed, the signal control circuit SGC in FIG. 2 is unnecessary.

As depicted in FIG. 11, the control signal coding circuit SDC is provided in the subscriber line circuit SLC. When state supervisory information for a subscriber line is detected by a loop detector LOOP DET, it is coded by the control signal coding circuit SDC and inserted in a speech channel of the forward highway HW-F and sent to the switch module SM, wherein it is provided to the signal processor SPR via the corresponding address of a speech path memory, the addresses of which have one-to-one correspondence to the lines. A control signal, such as for sending out the ringing signal to a subscriber station SUB, is transmitted from the signal processor SPR of the switch module SM to the subscriber line circuit SLC of the subscriber station SUB via the address of the backward speech path memory SPMB corresponding to the subscriber station and via the backward highway HW-B. In the subscriber line circuit SLC the control signal is detected by the control signal coding circuit SDC and branched to control a ringing control relay RLY at a predetermined timing.

When it is detected by the loop detector LOOP DET that the subscriber station is in the idle state, i.e. in the onhook state, a test loop circuit TLC in the subscriber line circuit SLC is connected. The control signal coding circuit SDC performs such control that a backward speech signal may be looped back to the forward side. This looping allows data on an address corresponding to the idle subscriber station to be read out from the backward speech path memory SPMB of the switch module SM and looped back in the subscriber line circuit SLC and written in the forward speech path memory SPMF at the address corresponding to the idle subscriber station. Therefore, with the signal processor SPR periodically conducting write and read collating for test data for the address of the forward/backward speech path memory corresponding to an idle subscriber station continuity tests of all lines can easily be achieved.

In FIG. 11 reference character TAC indicates a test access relay; RLY designates a ringing signal sending relay; E-HYB identifies an electric hybrid circuit; COD denotes a coder; DEC represents a decoder; and BR indicates a buffer register.

As described above, according to the present invention, the subscriber line circuit SLC is arranged, by large scale integration, so that the speech signal and the non-speech data can be processed together. The subscriber line circuit is capable of effectively performing a loop back test function when it is properly equipped. Further, the subscriber line circuit can easily be adapted for a new service such as, for example, combined processing of sound and data.

Figure 5:
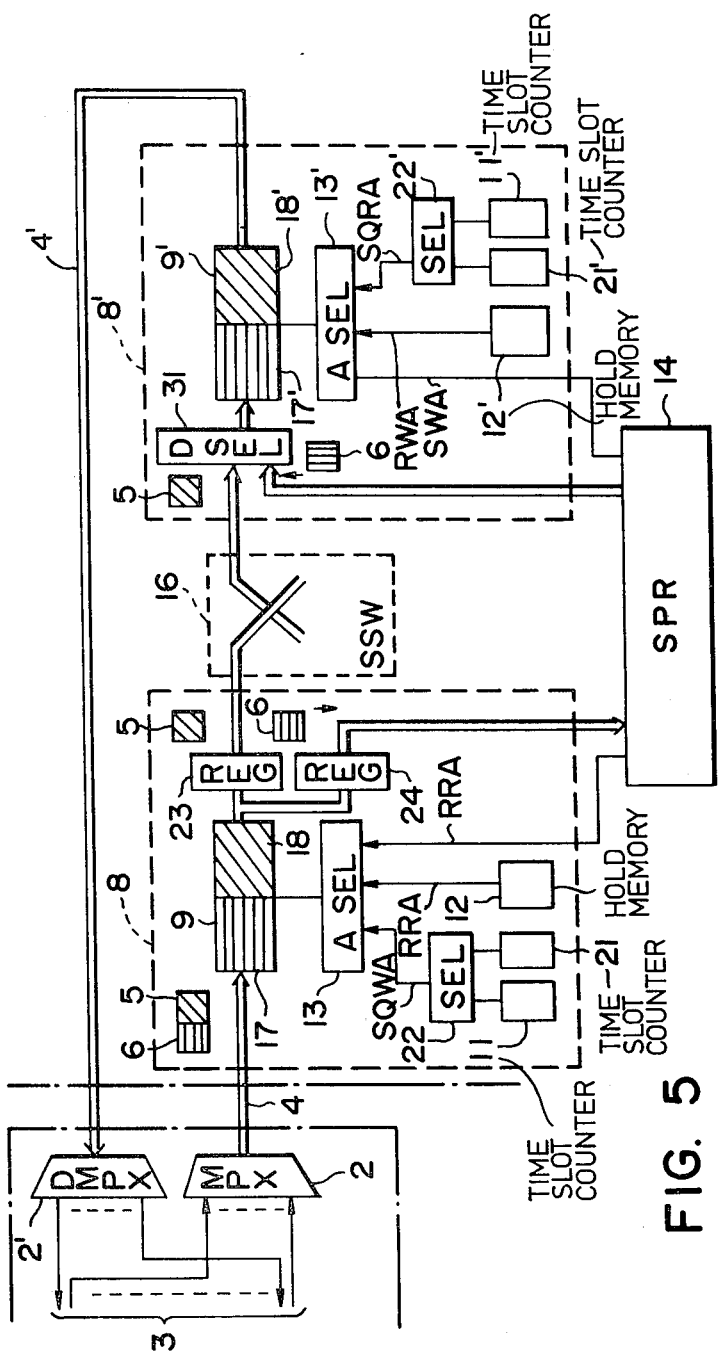
FIG. 5 is a block diagram illustrating another embodiment of the present invention.
Figure 6A:
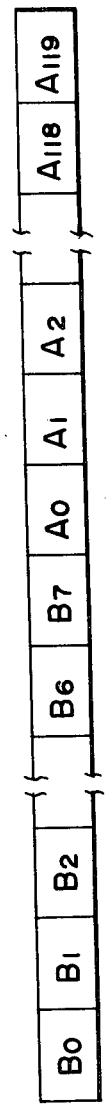
FIGS. 6(a) and 6(b) are diagrams illustrating an example of a data format usable in the embodiment of FIG. 5.
Figure 6B:
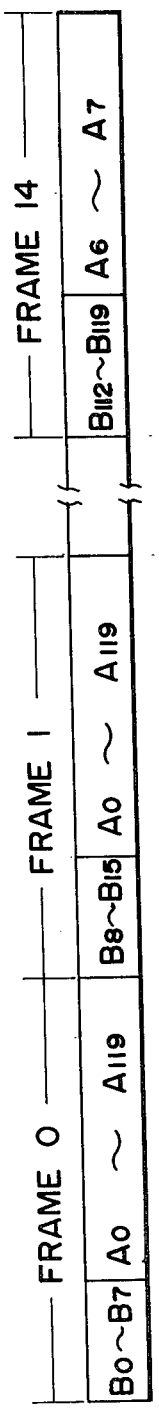

FIG. 5 illustrates in block diagram form another embodiment of the present invention. This embodiment differs from the prior art example of FIG. 1A in that no non-speech path memory is employed, the speech data 5 and the non-speech data 6 are properly controlled as described below, and both types of data are loaded in the speech path memories 9 and 9' of the time switches. The speech path memories 9 and 9' respectively have speech data storage areas 18 and 18' and non-speech data storage areas 17 and 17', each of which has addresses corresponding to lines connected to the line module. FIG. 6(a) shows an example of the format of data which is transferred from the multiplexer 2 to the highway 4. This data format is identical with that heretofore employed. One frame is composed of 128 channels or channel time slots and speech signals $A_0$ to $A_{119}$ from 120 subscriber lines 3 are each assigned to one of the 120 channels in one frame. To the remaining eight channels are assigned non-speech signals $B_0$ to $B_{119}$ from the subscriber lines 3 which correspond to eight subscriber lines. FIG. 6(a) shows the case where the non-speech signals $B_0$ to $B_7$ are assigned to the eight channels in one frame. In order to transmit all the non-speech signals $B_0$ to $B_{119}$ on the highway 4, the data has a multi-frame configuration which comprises 15 frames, as shown in FIG. 6(b). As depicted in FIG. 6(b), a frame 0 includes the non-speech signals $B_0$ to $B_7$, a frame 1 the non-speech signals $B_8$ to $B_{15}$ and a frame 14 the non-speech signals $B_{112}$ to $B_{119}$.

The memory cycle of the speech path memory 9 of the forward time switch 8 is such as shown in FIG. 7(a) in which one time cycle comprises four steps: ① sequential write, ② random read, ③ non-speech data read and ④ random read.

The step of the sequential write ① is divided into a step of speech data write and a step of non-speech data write. When the time slot counter 11 has reached a predetermined count indicating the speech data write step, a selector 22 applies to the address selector 13 a sequential write address SQWA for the speech data; and the speed data for each frame are sequentially written according to the address assigned by the address selector 13. When a time slot counter 21 has reached another predetermined count indicating the non-speech data write step, the selector 22 provides a sequential write address SQWA for the non-speech data to the address selector 13; and the non-speech data for each frame are written in the non-speech data storage area 17 of the speech path memory 9 in accordance with the address assigned by the address selector 13. In this case, since the data has the multi-frame configuration referred to above, the sequential write address SQWA is assigned so that the non-speech data in each of the frames 0 to 14 may be loaded at different addresses in the non-speech data storage area 17 of the speech path memory 9.

In the step of the random read ②, the speech data is read out from the speech data storage area 18 of the speech path memory 9 from the address assigned in accordance with a random read address RRA which is applied from the hold memory 12 to the address selector 13, as in the prior art system. The speech data thus read out is transferred via a register 23 to the space switch 16 of the next stage.

In the step of the non-speech data read ③, the non-speech data is read out in accordance with a non-speech data read address which is provided by the signal processor 14 to the address selector 13. The non-speech data thus read out is transferred via a second register 24 to the signal processor 14. The signal processor 14 receives the non-speech data and then determines the next read address.

Thereafter, the step of the random read ④ which is the same as the step ② is executed to complete one time slot.

The data transferred from the forward time switch 8 to the space switch 16 via the register 23 is applied to the backward time switch 8'. In the backward time switch 8', the speech data 5 transferred from the space switch 16 and the non-speech data 6 from the signal processor 14 are both provided to a data selector 31; and the data are written and read out in accordance with the memory cycle of the speech path memory 9'. FIG. 7(b) shows by way of example the memory cycle of the speech path memory 9'. In FIG. 7(b), one time slot cycle comprises of the steps: ① sequential read, ② random write, ③ non-speech data write and ④ random write.

In the step of the sequential read ①, the data stored in the speech path memory 9' are sequentially read out therefrom in the same manner as in the prior art system. In this case, a selector 22' provides a sequential read address SQRA to the address selector 13'.

In the step of the random write ②, the speech data 5 is stored in the speech data storage area 18' of the speech path memory 9' in accordance with a random write address RWA which is provided from the hold memory 12' to the address selector 13'.

In the step of the non-speech data write ③, a non-speech data write address SWA is applied from the signal processor 14 to the address selector 13'; and the non-speech data 6, which is applied from the signal processor 14 to the data selector 31, is written in the speech path memory 9' in accordance with the address SWA. In FIG. 5, reference numerals 11' and 12' indicate time slot counters similar to those 11 and 12.

As will be appreciated from the above, according to this embodiment, since no memory is required for the exclusive use of the non-speech data, the number of kinds of memories in the speech path equipment decreases so as to reduce the cost of the system. Further, the speech path memory is provided with a speech data storage area and a non-speech data storage area, and switching as well as switching signal control are possible in the same memory, so that software for exchange processing can be simplified.

Figure 8:
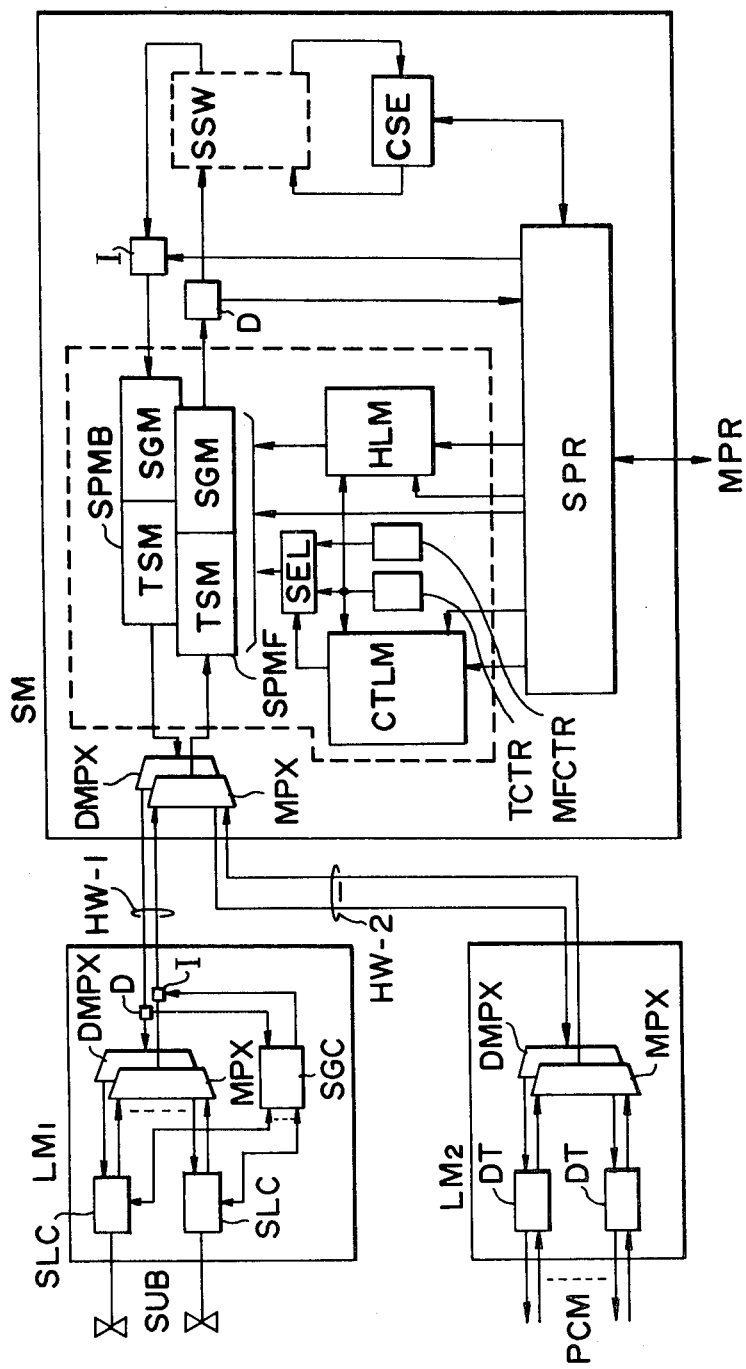
FIG. 8 is a block diagram illustrating another embodiment of the present invention.
Figure 9:
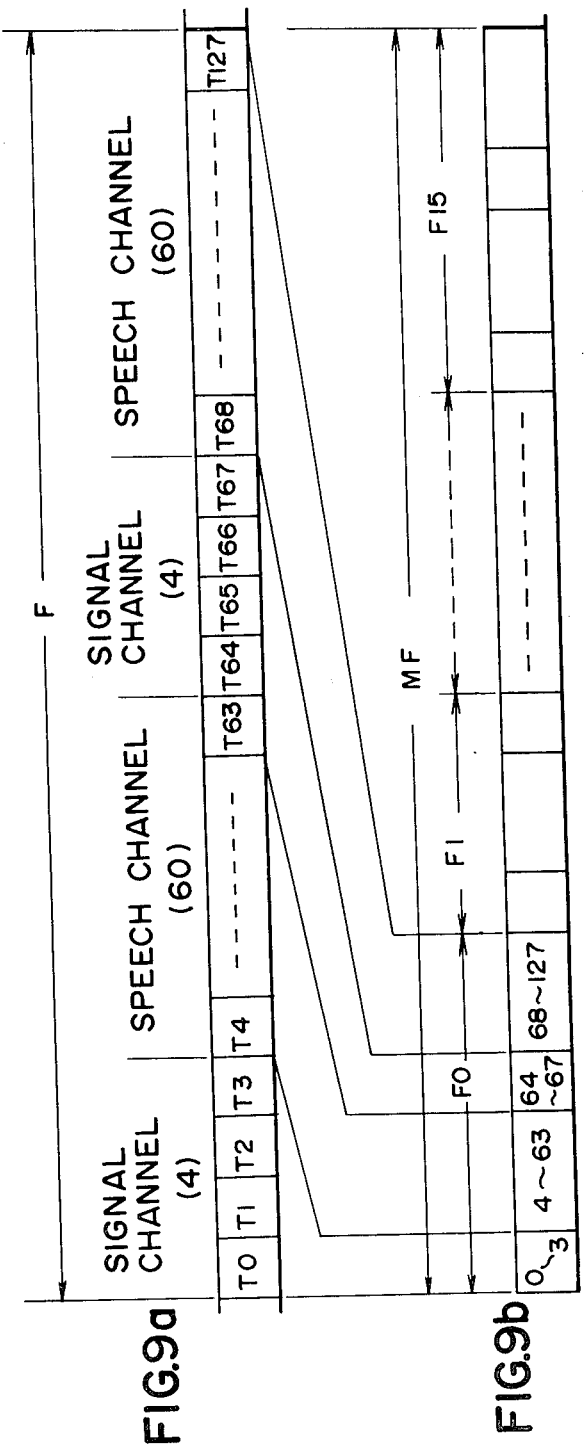
FIGS. 9(a) and 9(b) are diagrams illustrating an example of the frame configuration usable in the embodiment of FIG. 8.
Figure 10:
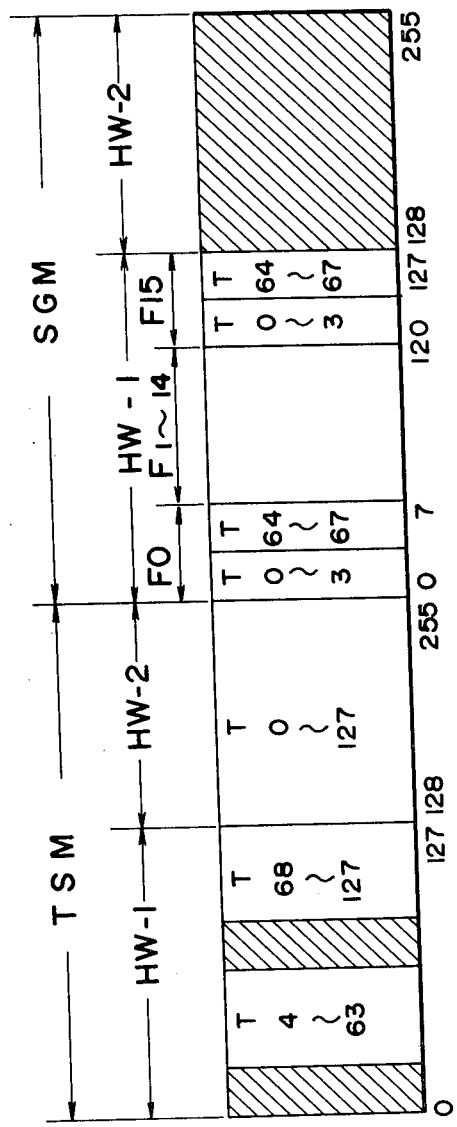
FIG. 10 is a diagram illustrating the construction of a speech path memory employed in the embodiment of FIG. 8.

Next, a description will be given, with reference to FIG. 8, of another embodiment of the present invention. FIG. 10 illustrates the construction of a speech path memory employed in the embodiment of FIG. 8. In FIG 8, a plurality of telephone circuits SUB are accommodated in line circuits SLC in the line module LM-1. Each line circuit SLC converts its accommodated telephone circuit SUB from a two wire to a four wire configuration and codes the sound signal into a PCM code, which is applied to the multiplexer MPX. Various control signals for controlling the operation of the line circuits SLC and supervising their state are provided to the signal control circuit SGC. The eight-bit coded sound signal is fed to the digital highway HW-1 without being concentrated by the multiplexer MPX. The signal control circuit SGC also time-division multiplexes the control signal for each line circuit SLC and provides it via the inserter I to the digital highway HW-1. The digital highway HW-1 repeatedly transmits the sound signal and the control signal every 125 microseconds using the frame format exemplified in FIG. 9(a). Each frame F is divided into 128 time slots T. Time slots T4 to T63 and T68 to T127 form 120 speech channels, each transmitting an eight-bit sound signal; and time slots T0 to T3 and T64 to T67 form eight signal channels, each transmitting an eight-bit control signal. These eight signal channels are able to transmit the control signals having a total of 1024 bits repeatedly every two milliseconds using a multi-frame format composed of 16 frames F as shown in FIG. 9(b). In the line module LM-2, time-division multiplexed PCM lines PCM (FIG. 8) are respectively accommodated in digital terminal equipment DT. A digital signal transmitted from each PCM line PCM is time-division multiplexed by the multiplexer MPX and applied to a digital highway HW-2. From the viewpoint of versatility and extendability of the system, the same frame format as that for the digital highway HW-1 is employed for the digital highway HW-2 and the digital signal is transmitted via the 120 speech channels.

The digital signal from each PCM line is transmitted in all the time slots T0 to T127 of the digital highway HW-2, that is, via the 120 speech channels and the eight signal channels. On the other hand, in the switch module SM the data transmitted from the line modules LM-1 and LM-2 over the digital highways HW-1 and HW-2 are converted by the multiplexer into eight-bit parallel codes such that one frame has 256 time slots, and the time slots are transmitted directly to the speech path memory SPMF of the forward time switch. The speech path memory SPMF is composed of a sound storage area TSM and a signal storage area SGM, as shown in FIG. 10. The sound storage area TSM has 256 addresses corresponding to all the time slots of the output from the multiplexer MPX. In FIG. 10, addresses 0 to 127 correspond to 128 time slots forming the digital highway HW-1 and addresses 128 to 255 correspond to 128 time slots forming the digital highway HW-2. In contrast thereto, the signal storage area SGM has 256 addresses which do not directly correspond to the time slots of the output from the multiplexer MPX. Also in the signal storage area SGM, addresses 0 to 127 correspond to the digital highway HW-1 and addresses 128 to 255 correspond to the digital highway HW-2, as is the case with the sound storage area TSM. Each address of the speech path memory SPMF has a storage capacity of eight bits. The addresses in the speech path memory SPMF at which the eight-bit parallel codes of each time slot transmitted from the multiplexer MPX are to be stored are assigned by a combination of a control memory CTLM, a multi-frame counter MFCTR and the time slot counter TCTR. The control memory CTLM has 256 addresses corresponding to all the time slots of the output from the multiplexer MPX. In each address of the control memory CTLM is stored a logic "0" or "1" depending on whether the eight-bit parallel codes transmitted in the corresponding time slot are stored in the sound storage area TSM or in the signal storage area SGM of the speech path memory SPMF. Also in the control memory CTLM, addresses 0 to 127 correspond to 128 time slots of the digital highway HW-1 and addresses 128 to 255 correspond to 128 time slots of the digital highway HW-2. The multi-frames F are received one after another and the multi-frame counter MFCTR indicates which one of the frames F in the multiframe MF shown in FIG. 9(b) is being received. In the digital highway HW-1, the time slots T0 to T3 and T64 to T67 are used as signal channels of the types shown in FIGS. 9(a) and 9(b) and the time slots T4 to T63 and T68 to T127 are used as speech channels corresponding to the subscriber stations SUB. Accordingly, logic "1" is stored in the addresses 0 to 3 and 64 to 67 of the control memory CTLM and logic "0" is stored in the addresses 4 to 63 and 68 to 127. Assuming that information has now been transmitted in the time slot T0 from the multiplexer MPX, the time slot counter TCTR assigns the address 0 in the control memory CTLM, from which logic "1" stored therein is read out and provided to the address selector SEL. Upon receipt of the logic "1" signal, the address selector SEL decides that the information transmitted in the time slot T0 is to be stored in the signal storage area SGM of the speech path memory SPMF, and stores the information in the address 0 of the signal storage area SGM under instructions from the time slot counter TCTR and the multi-frame counter MFCTR. In contrast thereto, no information is loaded in the address 0 of the sound storage area TSM. Likewise, information which is transmitted in the time slots T1 to T3 is stored in the addresses 1 to 3 of the signal storage area SGM. When information is transmitted next in the time slot T4, the time slot counter TCTR indicates the address 4 in the control memory CTLM to read out therefrom logic "0", which then is transmitted to the address selector SEL. Then the address selector SEL decides that the information transmitted in the time slot T4 is to be loaded in the sound storage area TSM, and loads the information in the address 4 of the sound storage area TSM under instructions from the time slot counter TCTR. In a similar manner, information which is transmitted in the time slots T5 to T63 is loaded in the addresses 5 to 63 of the sound storage area. Further, when information has been transmitted in the time slots 64 to 67, logic "1" is read out from the addresses 64 to 67 of the control memory CTLM, so that the address selector SEL stores the information in the signal storage area SGM at the addresses 4 to 7 under instructions from the time slot counter TCTR and the multi-frame counter MFCTR. Consequently, no information is loaded in the sound storage area TSM at the addresses 64 to 67. Next, when information has been transmitted in the time slots T68 to T127, logic "0" is read out from the addresses 68 to 127 of the control memory CTLM, so that the address selector SEL stores the information in the sound storage area TSM at the addresses 68 to 127 under instructions from the time slot counter TCTR. The information thus stored in the addresses 4 to 63 and 68 to 127 of the sound storage area TSM of the speech path memory SPMF is updated upon each arrival of a new frame F. In the signal storage area SGM, upon each arrival of a new frame F, information transmitted in the time slots T0 to T3 and T64 to T67 is stored in eight addresses adjacent to the previously filled addresses under instructions from the time slot counter TCTR and the multi-frame counter MFCTR; and, in the last frame 15 of one multiframe MF, information in time slots $T_0$ to $T_3$ and $T_{64}$ to $T_{67}$ is stored in the signal storage area SGM at the addresses 120 to 127. The information thus stored in the signal storage area SGM of the speech path memory SPMF is updated upon each arrival of a new multiframe MF, while the information is added to during any one multiframe. In the digital highway HW-2, since all the time slots T0 to T127 are used for the transmission of digital signals, logic "0" is loaded in all the addresses 128 to 255 of the control memory CTCM. Accordingly, information transmitted in the time slots T128 to T255 from the multiplexer MPX is stored in the addresses 128 to 255 of the sound storage area TSM of the speech path memory SPMF under instructions from the address selector SEL and the time slot counter TCTR; and no information is loaded in the addresses 128 to 255 of the signal storage area SGM. The information thus stored in the addresses 128 to 255 of the sound storage area TSM is updated upon each arrival of a new frame F. The information stored in the sound storage area TSM of the speech path memory SPMF is read out based on switching information stored in a hold memory HLM, as in the case of FIG. 1, and the information is provided via the space switch SSW to the speech path memory SPMB of the backward time switch and thence connected to an arbitrary accommodation terminal. Therefore, the exchange control of the PCM line data accommodated on the digital highway HW-2 is achieved by connecting a common control channel on the PCM lines directly to the common signalling equipment CSE via the speech channel and conducting communication signaling with similar equipment at a remote station. The information stored in the signal storage area SGM is read out at an arbitrary moment under the control of the signal processor SPR and provided via the dropper D to the signal processor SPR. The backward speech path memory SPMB is also composed of the same sound storage area TSM and signal storage area SGM as those of the forward speech path memory SPMF. Into the sound storage area TSM is loaded information which is transmitted from the space switch SSW, whereas into the signal storage area SGM is stored information which is transmitted via the inserter I from the signal processor SPR. Thereafter, the information is read out from the speech path memory SPMB following procedures reverse to that used for storing the information in the speech path memory SPMF; and the information thus read out is transmitted in the time slots of the digital highways HW-1 and HW-2 via a demultiplexer DMPX to the line modules LM-1 and LM-2.

As will be appreciated from the above, according to this embodiment, the speech path memories SPMF and SPMB of the switch module SM are each provided with the sound storage area TSM and the signal storage area SGM. When transmitting control signals via the speech channel using such a special system as the common signalling system, as in the case of the line module LM-2, the information transmitted in all of the time slots T0 to T127 of the digital highway HW-2 is stored in the 128 addresses of the sound storage areas TSM of the speech path memories SPMF and SPMB. When transmitting control signals separately from the sound signals of 120 subscriber stations SUB as in the case of the line module LM-1, only the information transmitted in the time slots T4 to T63 and T68 to T127 of the digital highway HW-1 is loaded in the 120 addresses of the sound storage area TSM; and the information transmitted in the time slots T0 to T3 and T64 to T67 specified as signal channels is loaded in a multi-frame form in the signal storage area SGM. Accordingly, the digital highways HW-1 and HW-2 each transmit sound (digital) signals or control signals in all the time slots in accordance with the kind of line module; thus, the highway transmission ability is fully utilized.

The foregoing embodiments are merely illustrative of the present invention; for example, the line modules LM-1 and LM-2 are not specifically limited to the illustrated ones and may be variously modified. Further, the data frame format of the digital highway HW-1 and the arrangements of the speech channel and the signal channel are not limited to those depicted in FIGS. 9(a) and 9(b); and various other modifications may be effected. In addition, when the arrangement of the signal channels is common to all the line modules which use the signal channels, it is also possible to make the address assignment of the signal storage area SGM constant by loading for each line module only information identifying whether the line module uses the signal channel or not, without loading in the control memory CTLM the identify information (logic "0" or "1") corresponding to all the time slots of each line module as described previously. The present invention can equally be applied to such a case.

Although the foregoing embodiments have been described in connection with the case where the number of subscribers is 120 and one frame of data has eight channels, the present invention is not specifically limited thereto and the numbers of each can be selected as desired.

Numerous changes may be made in the described systems and different embodiments of the invention may be made without departing from the spirit thereof; therefore it is intended that all matters contained in the foregoing descriptions and in the accompanying drawings shall be interpreted as illustrative and not in a limiting sense.

We claim:

1. A signal control system, operatively connected to lines, for controlling a non-speech signal of a time division switching system, comprising:
    a line module, operatively connected to the lines, for time division multiplexing the lines;

a switch module including a speech path memory and a hold memory for storing write or read control addresses of the speech path memory, the speech path memory having addresses corresponding to all the connected lines;

a multiplex highway, operatively connected between said line module and said switch module, having speech channels; and means, operatively connected to the speech path memory, for writing the non-speech signal in and reading it out of an arbitrary one of the addresses of the speech path memory; and said line module further comprising means, operatively connected between said switch module and said multiplex highway, for transmitting and receiving the non-speech signal to and from said switch module via an arbitrary one of the speech channels of said multiplex highway.

2. A signal control system according to claim 1, wherein said non-speech signal transmitting and receiving means comprises a subscriber line circuit.

3. A signal control system according to claim 1, wherein said non-speech signal transmitting and receiving means comprises a subscriber line circuit including a test loop back circuit.

4. A signal control system, operatively connected to lines, for controlling speech and non-speech signals for a time division switching system, comprising:

a line module, operatively connected to the lines for time division multiplexing the lines;

a switch module including:
  a speech path memory having a speech signal storage area and a non-speech signal storage area, each having addresses corresponding to all of the connected lines; and
  a hold memory for storing write or read control addresses for the speech path memory;

a multiplex highway, operatively connected between the line module and the switch module, having channel time slots for transmitting the speech and non-speech signals; and writing and reading means, operatively connected to the speech path memory, for writing in the speech signal storage area of the speech path memory the speech signal from one of the channel time slots transmitted by said multiplex highway, for writing the non-speech signal in the non-speech signal storage area from one of the channel time slots transmitted by said multiplex highway, and for independently reading out the non-speech signal from the non-speech signal storage area.

5. A signal control system according to claim 4, wherein the speech path memory being operatively connected on the input side of each of the connected lines.

6. A signal control system according to claim 4, wherein the speech path memory being operatively connected on the output side of each of the connected lines.

7. A signal control system according to claim 4, wherein said writing and reading means further comprising means for specifying, for each line module in connection with an arbitrary channel time slot, which one of the speech signal storage area and the non-speech signal storage area of the speech path memory the speech or non-speech signal transmitted in the channel time slot is written.

8. A signal control system for a time division switching system, where the signal control system is operatively connected to lines which provide speech and non-speech signals, said signal control system comprising:

a line module, operatively connected to the lines, multiplexing the speech and non-speech signals; and a switch module, operatively connected to said line module, including:
  a speech path memory, operatively connected to said line module, storing and passing therethrough both the speech and non-speech signals;
  means, operatively connected to said speech path memory, for reading out one of the non-speech signals, generating a new non-speech signal in dependence upon the non-speech signal read out and writing into said speech path memory the new non-speech signal; and
  a space switch operatively connected to said speech path memory.

9. A signal control system according to claim 8, wherein said switch module further comprises means, operatively connected to said speech path memory, for controlling where the speech and non-speech signals are stored in said speech path memory.

* * * * *

UNITED STATES PATENT AND TRADEMARK OFFICE
CERTIFICATE OF CORRECTION

PATENT NO. : 4,466,095
DATED : AUGUST 14, 1984
INVENTOR(S) : HISAO KAWANO ET AL.

It is certified that error appears in the above-identified patent and that said Letters Patent is hereby corrected as shown below:

Col. 1, line 20, "recei" should be --receives--.

Col. 2, line 9, "of" should be --in--;
line 59, "(pulse coded modulation) PCM" should be --PCM (pulse coded modulation)--.

Col. 4, line 47, "data;" should be --data--;
line 48, "data" should be --data;--.

Col. 5, line 33, "to" should be --into--; and
"performs" should be --which performs--.

Col. 8, line 41, after "be" insert --specifically--.

Col. 9, line 5, "onhook" should be --on-hook--;
line 30, "efffectively" should be --effectively--.

Col. 10, line 52, delete "of".

Signed and Sealed this

Fifth Day of March 1985

[SEAL]

Attest:

DONALD J. QUIGG

*Attesting Officer*  *Acting Commissioner of Patents and Trademarks*